US012558877B2

(12) United States Patent
Hagen et al.

(10) Patent No.: US 12,558,877 B2
(45) Date of Patent: Feb. 24, 2026

(54) COMPOSITE PANE FOR A HEAD-UP DISPLAY

(71) Applicant: SAINT-GOBAIN GLASS FRANCE, Courbevoie (FR)

(72) Inventors: Jan Hagen, Bonn (DE); Pauline Girard, Compiegne (FR)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 376 days.

(21) Appl. No.: 18/040,089

(22) PCT Filed: Sep. 16, 2021

(86) PCT No.: PCT/EP2021/075461
§ 371 (c)(1),
(2) Date: Jan. 31, 2023

(87) PCT Pub. No.: WO2022/069240
PCT Pub. Date: Apr. 7, 2022

(65) Prior Publication Data
US 2023/0271406 A1 Aug. 31, 2023

(30) Foreign Application Priority Data
Sep. 30, 2020 (EP) .................................... 20199286

(51) Int. Cl.
B32B 17/10 (2006.01)
G02B 5/08 (2006.01)
G02B 27/01 (2006.01)

(52) U.S. Cl.
CPC .... B32B 17/10036 (2013.01); B32B 17/1011 (2013.01); B32B 17/10201 (2013.01); B32B 17/10458 (2013.01); G02B 5/0833 (2013.01); G02B 5/0858 (2013.01); B32B 2307/418 (2013.01); B32B 2457/20 (2013.01); G02B 27/0101 (2013.01)

(58) Field of Classification Search
None
See application file for complete search history.

(56) References Cited

U.S. PATENT DOCUMENTS

| | | | | |
|---|---|---|---|---|
| 2012/0017975 A1* | 1/2012 | Giron | .................. | B32B 17/1055 |
| | | | | 428/215 |
| 2014/0151355 A1* | 6/2014 | Lisinski | .............. | B32B 17/1077 |
| | | | | 156/99 |
| 2016/0054492 A1* | 2/2016 | Ihara | .................. | C03C 17/3681 |
| | | | | 359/359 |

FOREIGN PATENT DOCUMENTS

| | | | | |
|---|---|---|---|---|
| CN | 103073196 A | 5/2013 | | |
| CN | 104267499 A | 1/2015 | | |
| CN | 106094072 A | 11/2016 | | |
| CN | 106564242 A | 4/2017 | | |
| CN | 106646874 A | 5/2017 | | |
| CN | 110121414 A | 8/2019 | | |
| CN | 111433023 A | 7/2020 | | |
| DE | 10 2014 220189 A1 | 4/2016 | | |
| DE | 20 2019 102388 U1 | 5/2019 | | |
| RU | 2652513 C2 * | 4/2018 | ......... | C03C 17/3652 |
| WO | WO 2019/179682 A1 | 4/2016 | | |
| WO | WO 2019/046157 A1 | 3/2019 | | |
| WO | WO 2019/110172 A1 | 6/2019 | | |
| WO | WO 2020/094422 A1 | 5/2020 | | |

OTHER PUBLICATIONS

Lu et al., CN 106646874, May 10, 2017 (machine translation) (Year: 2017).*
Din et al., RU-2652513-C2, Apr. 26, 2018 (machine translation) (Year: 2018).*
International Search Report as issued in International Patent Application No. PCT/EP2021/075461, dated Dec. 7, 2021.
First Office Action as issued in Chinese Patent Application No. 202180003765.9, dated Jul. 26, 2025.

* cited by examiner

*Primary Examiner* — Cheng Yuan Huang
(74) *Attorney, Agent, or Firm* — Pillsbury Winthrop Shaw Pittman LLP

(57) ABSTRACT
A composite pane for a head-up display, includes a first pane having a first surface and a second surface, a second pane having a first surface and a second surface, and a thermoplastic intermediate layer, which is arranged between the second surface of the first pane and the first surface (III) of the second pane, an HUD region, and a first coating for reflecting p-polarized radiation and has exactly one electrically conductive layer based on silver, wherein a second coating for reducing the total transmitted thermal radiation is provided.

21 Claims, 3 Drawing Sheets

COMPOSITE PANE FOR A HEAD-UP DISPLAY

CROSS-REFERENCE TO RELATED APPLICATIONS

Figure 1:
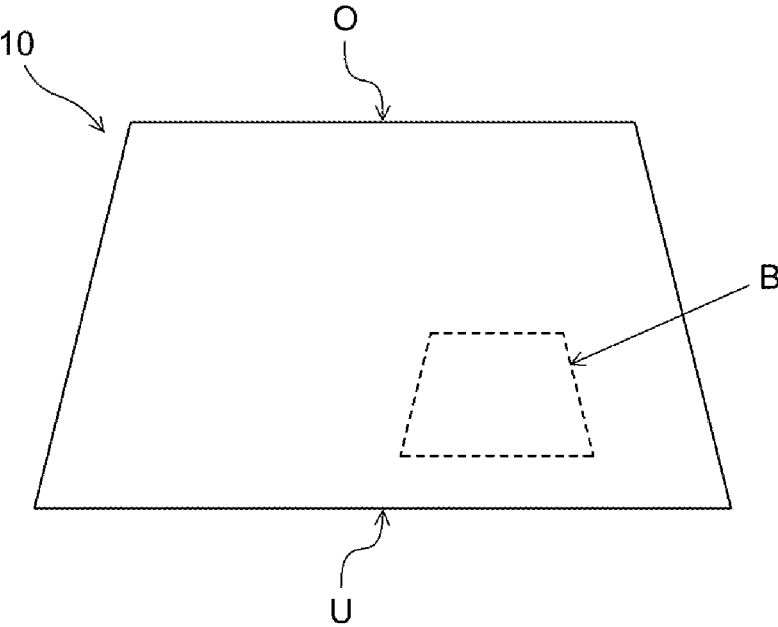

This application is the U.S. National Stage of PCT/EP2021/075461, filed Sep. 16, 2021, which in turn claims priority to European patent application number 20199286.4 filed Sep. 30, 2020. The content of these applications are incorporated herein by reference in their entireties.

The invention relates to a composite pane for a head-up display and a projection arrangement for a head-up display.

Vehicles, in particular passenger cars, are increasingly often equipped with so-called head-up displays. A head-up display (HUD) is a display system that projects additional data for the driver of the vehicle into his field of vision in the form of images.

The head-up display consists of a projector (imaging unit) and multiple optics modules for deflecting or mirroring (reflecting) an image onto a projection surface or reflection surface. Usually, a composite pane, in particular the windshield of the vehicle, serves as the projection surface. Although the image is projected onto the windshield, it floats, as perceived by the human eye of the driver, at a distance above the hood of the vehicle.

Thus, additional data can be projected into the driver's field of vision, for example, the current driving speed and navigation or warning messages, which the driver can perceive without having to change his viewing direction. Head-up displays can thus contribute significantly to an increase in traffic safety.

Usually, the image generated by the projector consists of polarized, in particular s-polarized light radiation. The s-polarized light strikes the composite pane at a specific angle of incidence and is at least partially both refracted into the composite pane and reflected as s-polarized light into the field of vision of the driver. However, the reflected images are not color neutral or are displayed with unwanted reflection, so-called double images.

The angle of incidence of the s-polarized radiation is usually about 65°, which corresponds roughly to Brewster's angle for an air/glass transition (57.2° for soda lime glass). The problem arises that the projector image is reflected at both external transitions from air to glass and from glass to air. As a result, in addition to the desired primary image, a slightly offset secondary image also appears, the so-called ghost image ("ghost"). The problem is usually mitigated by arranging the surfaces of the windshield at an angle relative to one another. This occurs through the use of a wedge-shaped intermediate layer in the lamination of the windshield implemented as a composite pane. As a result, the primary image and the ghost image can be superimposed on one another.

Wedge films are expensive such that production of such a composite pane for an HUD is quite cost intensive. Consequently, there is a need for HUD systems that work with windshields without wedge films. For example, it is possible to operate the HUD projector with p-polarized radiation, which is not significantly reflected at the pane surfaces due to incidence near Brewster's angle. Instead, the windshield has a reflection coating as a reflection surface for the p-polarized radiation.

DE 10 2014 220189 A1 discloses an HUD projection arrangement with p-polarized radiation and a metallic layer as a reflecting structure. WO 2019/046157 A1 also discloses an HUD system with p-polarized radiation. In it, a reflection coating with at least two metallic layers is used.

CN 106 646 874 A appears to disclose a composite pane for an HUD. The composite pane has a nano coating that reflects p-polarized light.

WO 2020/94422 A1 discloses a composite pane for an HUD system. The composite pane has an electrically conductive coating on a surface of the outer pane or the inner pane facing the intermediate layer or within the intermediate layer, wherein the radiation of the HUD projector is p-polarized.

Glazings as are used in windshields, panoramic roofs, and sunroofs are known to require specific sun protection. A measure of the total thermal radiation transmitted through the pane is described by the so-called TTS value. The TTS value can be measured, for example, according to ISO 13837. With high light transmittance, too much thermal radiation is transmitted through the glazing. With very low light transmittance, the glazing is too dark overall such that the person behind the glazing can no longer see through it.

The object of the present invention consists in providing a composite pane for a head-up display that has good reflectivity for p-polarized radiation in the visible spectral range and improves the TTS value.

The object of the present invention is accomplished according to the invention by a composite pane in accordance with claim 1. Preferred embodiments are apparent from the dependent claims.

The composite pane for a head-up display (HUD) according to the invention has a first pane and a second pane that are joined to one another via a thermoplastic intermediate layer. The first pane has a first surface (I) and a second surface (II). The second pane likewise has a first surface (III) and a second surface (IV). In addition, the composite pane has an HUD region and a first coating suitable for reflecting p-polarized radiation. The first coating comprises exactly one electrically conductive layer based on silver.

The composite pane is intended, in a window opening of a vehicle, to separate the interior from the outside surroundings. The composite pane is preferably the windshield of a motor vehicle, in particular of a passenger car or a truck.

As is usual with HUDs, a projector irradiates a region of the windshield, where the radiation is reflected in the direction of the viewer (driver), generating a virtual image that the viewer perceives from his perspective as behind the windshield. The region of the windshield that can be irradiated by the projector is referred to as an HUD region. The beam direction of the projector can be varied by optical elements (e.g., mirrors), in particular vertically, in order to adapt the projection to the body size of the viewer.

P-polarized radiation is used to generate an HUD image. The composite pane has a first coating that is suitable for reflecting p-polarized radiation, comprising an electrically conductive layer based on silver.

Since the angle of incidence typical for HUD projection arrangements of about 65° is relatively close to Brewster's angle for an air/glass transition (57.2°, soda lime glass), p-polarized radiation is hardly reflected by the pane surfaces, whereas s-polarized radiation is reflected much more strongly. The reflection of the p-polarized radiation occurs mainly at the first coating.

A second coating is provided to reduce the transmittance of the total thermal radiation. This minimizes the heating in the interior of rooms or vehicles and reduces the energy outlay for creating an ambient climate that is comfortable for the person inside.

In other words, according to the invention, provision is made for the composite pane to have a first coating for reflecting p-polarized radiation and a second coating for reducing the total transmitted thermal radiation through the composite pane. Surprisingly, it is been found that, compared to the previously known composite panes, such a composite pane according to the invention has significantly improved TTS values (ISO 13837). In the case of transmittance in the visible range>70%, the TTS value can be reduced by as much as 5% in this way without negatively affecting the optical reflection properties of the composite pane.

In a preferred embodiment, the first reflection coating is arranged on a surface (I, II) of the first pane, and the second coating is arranged on a surface (III, IV) of the second pane. Alternatively, the first coating can be arranged on a surface (III, IV) of the second pane; and the second coating, on a surface (I, II) of the first pane. The first and the second coating are preferably applied on a surface of the two panes facing the intermediate layer, wherein the first coating can be arranged on the second surface (II) of the first pane; and the second coating, on the first surface (III) of the second pane. Alternatively, the first coating can be arranged on the first surface (III) of the second pane, and the second coating, on the second surface (II) of the first pane.

The second coating preferably has a plurality of purely dielectric layers, wherein it includes at least one first dielectric layer or layer sequence with a refractive index greater than 1.9 and a second purely dielectric layer or layer sequence with a refractive index less than 1.6. Particularly preferably, a third purely dielectric layer or layer sequence with a refractive index greater than 1.9 can be provided, wherein the second purely dielectric layer or layer sequence is arranged between the first purely dielectric layer or layer sequence and the third purely dielectric layer or layer sequence. The layers or layer sequences can be built up alternatingly atop one another. The first and second purely dielectric layer or layer sequence preferably contains silicon nitride $Si_3N_4$, tin oxide $SnO_2$, zinc oxide ZnO, titanium dioxide $TiO_2$, zirconium dioxide $ZrO_2$, hafnium oxide $HfO_2$, vanadium oxide $V_2O_5$, niobium oxide $Nb_2O_5$, tantalum oxide $Ta_2O_5$, tungsten oxide $WO_3$. The second purely dielectric layer or layer sequence preferably contains silicon dioxide $SiO_2$, calcium fluoride $CaF_2$, magnesium fluoride $MgF_2$, or a nanoporous layer.

The second purely dielectric layer or layer sequence has high mechanical and chemical stability and is not very sensitive to water or organic contaminants. Its production is associated with significantly lower costs. The anti-reflective effect is determined, on the one hand, by the refractive index and, on the other, by the thickness of the second purely dielectric layer or layer sequence. In the case of the nanoporous layer, the refractive index depends on the pore size and the density of the pores. In a preferred embodiment, the pores are dimensioned and distributed such that the refractive index is from 1.2 to 1.4, particularly preferably from 1.25 to 1.35. The thickness of the second purely dielectric layer or layer sequence is preferably from 30 nm to 500 nm, particularly preferably from 50 nm to 150 nm.

The first coating is a thin layer stack. The thin layer stack consists of a layer sequence of thin individual layers. This thin layer stack contains at least one electrically conductive layer based on silver. The electrically conductive layer based on silver gives the first coating the basic reflecting properties and also an IR-reflecting effect as well as electrical conductivity. The electrically conductive layer based on silver can also be referred to simply as a silver layer.

The electrically conductive layer preferably contains at least 90 wt.-% silver, particularly preferably at least 99 wt.-% silver, most particularly preferably at least 99.9 wt.-% silver. The silver layer can have dopants, for example, palladium, gold, copper, or aluminum. The geometric layer thickness of the silver layer is preferably at most 15 nm [nanometers], particularly preferably at most 14 nm, most particularly preferably 10 nm. As a result, advantageous reflectivity in the IR range can be achieved, without excessively reducing transmittance in the visible range. The geometric layer thickness of the silver layer is preferably at least 7 nm, particularly preferably at least 8 nm. Particularly preferably, the geometric layer thickness of the silver layer is from 10 nm to 14 nm.

In an advantageous embodiment, the first coating includes no dielectric layers with a refractive index less than 1.9. I.e., all dielectric layers of the reflection coating have a refractive index of at least 1.9. It is a particular advantage of the present invention that the desired reflection properties can be achieved with relatively high-refractive-index dielectric layers alone. Since, in particular, silicon oxide layers, which have low deposition rates in magnetron-enhanced cathodic deposition, come into consideration for low-refractive-index layers with a refractive index of less than 1.9, the first coating can thus be produced quickly and economically.

The first coating contains a dielectric layer or a dielectric layer sequence with a refractive index of at least 1.9 above and below the silver layer, independently of one another in each case. The dielectric layers can, for example, be based on silicon nitride, zinc oxide, tin-zinc oxide, mixed silicon-metal nitrides, such as silicon-zirconium nitride, zirconium oxide, niobium oxide, hafnium oxide, tantalum oxide, tungsten oxide, or silicon carbide. The oxides and nitrides mentioned can be deposited stoichiometrically, substoichiometrically, or superstoichiometrically. They can have dopants, for example, aluminum, zirconium, titanium, or boron.

The optical thickness of the upper dielectric layer or layer sequence of the first coating is preferably from 50 nm to 200 nm, particularly preferably from 130 nm to 170 nm. The optical thickness of the lower dielectric layer or layer sequence is preferably from 30 nm to 100 nm, particularly preferably from 35 nm to 90 nm. Good results are achieved with this.

In principle, it is sufficient for the HUD region of the composite pane, in particular as a windshield, to be provided with the first coating and second coating. However, other regions can also be provided with the first and second coating. The composite pane can be provided with the first and second coating over substantially the entire surface, which can be preferred for manufacturing reasons.

In one embodiment of the invention, at least 80% of the pane surface is provided with the first and second coating. In particular, the first and second coating are applied over the entire surface of the pane with the exception of a circumferential edge region and, optionally, a local region intended to ensure the transmittance of electromagnetic radiation through the windshield as communication windows, sensor windows, or camera windows; and are, consequently, not provided with the first coating. The circumferential uncoated edge region has, for example, a width of up to 20 cm. It prevents direct contact of the first coating with the surrounding atmosphere such that the first coating is protected, in the interior of the windshield, against corrosion and damage.

The composite pane according to the invention is responsible for high reflectivity for p-polarized radiation in the spectral range from 450 nm to 650 nm (nanometers), which is relevant for HUD displays. HUD projectors typically operate with wavelengths of 473 nm, 550 nm, and 630 nm (RGB). A high-intensity HUD image is thus achieved.

The projector is arranged in the interior relative to the composite pane and irradiates the composite pane via an interior-side surface of the second pane. In the context of the invention, "exterior-side surface" refers to that primary surface that is intended, in the installed position, to face the external surroundings. In the context of the invention, "interior-side surface" refers to that primary surface that is intended, in the installed position, to face the interior.

The projector is directed toward the HUD region and irradiates it to generate the HUD projection. According to the invention, the radiation of the projector is predominantly p-polarized, i.e., has a p-polarized radiation component greater than 50%. The higher the proportion of the p-polarized radiation in the total radiation of the projector, the stronger the intensity of the desired projection image and the weaker the intensity of an undesirable reflection on the surface (IV) of the interior-side second pane of the composite pane. The proportion of p-polarized radiation of the projector is preferably at least 70%, particularly preferably at least 80%, and in particular preferably at least 90%. In a particularly advantageous embodiment, the radiation of the projector is essentially purely p-polarized—the p-polarized radiation proportion is thus 100% or deviates only insignificantly therefrom. The indication of the polarization direction is based here on the plane of incidence of the radiation on the composite pane, in particular the windshield. The expression "p-polarized radiation" refers to radiation whose electric field oscillates in the plane of incidence. "S-polarized radiation" refers to radiation whose electric field oscillates perpendicular to the plane of incidence. The plane of incidence is spanned by the vector of incidence and the surface normal of the windshield in the geometric center of the irradiated region.

The radiation of the projector preferably strikes the windshield at an angle of incidence from 45° to 75°, in particular from 60° to 70°. In an advantageous embodiment, the angle of incidence deviates from Brewster's angle by at most 10°. The p-polarized radiation is then reflected only insignificantly at the surfaces of the inner pane such that no ghost image is generated. The angle of incidence is the angle between the vector of incidence of the projector radiation and the interior-side surface normal (i.e., the surface normal on the interior-side external surface of the windshield) in the geometric center of the HUD region. Brewster's angle for an air/gas transition in the case of soda lime glass which is generally customary for window panes is 57.2°. Ideally, the angle of incidence should be as close as possible to this Brewster's angle. However, angles of incidence of 65°, which are common for HUD projection arrangements, are easily implemented in vehicles, and deviate only slightly from Brewster's angle, can, for example, also be used such that the reflection of the p-polarized radiation increases only insignificantly.

Since the reflection of the projector radiation occurs substantially at the first coating and not at the external pane surfaces, it is not necessary to arrange the external pane surfaces at an angle relative to one another in order to avoid ghost images. The external surfaces of the composite pane are, consequently, preferably arranged substantially parallel to one another. The thermoplastic intermediate layer is preferably not implemented wedge-like, but, instead, has a substantially constant thickness, in particular even in the vertical course between the upper edge and the lower edge of the windshield, just like the inner pane and the outer pane. A wedge-like intermediate layer would, in contrast, have a variable thickness, in particular an increasing thickness, in the vertical course between the lower edge and the upper edge of the windshield. The intermediate layer is typically formed from at least one thermoplastic film. Since standard films are significantly more economical than wedge films, the production of the windshield is more economical.

The first pane and the second pane are preferably made of glass, in particular of soda lime glass, which is customary for window panes. In principle, however, the panes can also be made of other types of glass (for example, borosilicate glass, quartz glass, aluminosilicate glass) or transparent plastics (for example, polymethyl methacrylate or polycarbonate). The thickness of the first pane as the outer pane and the second pane as the inner pane can vary widely. Preferably used are panes with a thickness in the range from 0.8 mm to 5 mm, preferably from 1.1 mm to 2.5 mm, for example, those with the standard thicknesses of 1.6 mm or 2.1 mm.

The first pane, the second pane, and the thermoplastic intermediate layer can be clear and colorless, but also tinted or colored. In a preferred embodiment, the total transmittance through the windshield (including the reflection coating) is greater than 70%. The term "total transmittance" is based on the process for testing the light permeability of motor vehicle windows specified by ECE-R 43, Annex 3, § 9.1. The first pane and the second panes can, independently of one another, be non-prestressed, partially prestressed, or prestressed. If at least one of the panes is to be prestressed, this can be thermal or chemical prestressing.

In an advantageous embodiment, the first pane is tinted or colored. This can reduce the exterior-side reflectivity of the composite pane, as a result of which the impression of the pane is more pleasing for an outside viewer. However, to ensure the legally required light transmittance of 70% (total transmittance) for windshields, the outer pane (here, i.e., the first pane) should preferably have light transmittance of at least 80%, particularly preferably of at least 85%. The second pane and the intermediate layer are preferably clear, i.e., not tinted or colored. For example, green or blue colored glass can be used as the outer pane.

The composite pane is preferably curved in one or a plurality of spatial directions, as is customary for motor vehicle window panes, wherein typical radii of curvature are in the range from approx. 10 cm to approx. 40 m. The composite pane can, however, also be flat, for example, when it is intended as a pane for buses, trains, or tractors.

The thermoplastic intermediate layer contains at least one thermoplastic polymer, preferably ethylene vinyl acetate (EVA), polyvinyl butyral (PVB), or polyurethane (PU) or mixtures or copolymers or derivatives thereof, particularly preferably PVB. The intermediate layer is typically formed from a thermoplastic film. The thickness of the intermediate layer is preferably from 0.2 mm to 2 mm, particularly preferably from 0.3 mm to 1 mm.

The composite pane can be produced by methods known per se. The first pane and the second pane are laminated together via the intermediate layer, for example, by autoclave methods, vacuum bag methods, vacuum ring methods, calender methods, vacuum laminators, or combinations thereof. The bonding of the outer pane and the inner pane is usually done under the action of heat, vacuum, and/or pressure.

The first coating is preferably applied by physical vapor deposition (PVD) onto a pane surface, particularly preferably by cathodic sputtering ("sputtering"), most particularly preferably by magnetron-enhanced cathodic sputtering ("magnetron sputtering"). The second coating is preferably applied by PVD or by a wet chemical deposition method. The coatings are preferably applied before lamination.

The invention also includes a projection arrangement for a head-up display, wherein the projection arrangement comprises the composite pane according to the invention and a projector, wherein the projector is directed toward the HUD region of the composite pane and the radiation of the projector is predominantly p-polarized.

In the following, the invention is explained in detail with reference to figures and exemplary embodiments. The figures are a schematic representation and are not to scale. The figures in no way restrict the invention.

Figure 2:
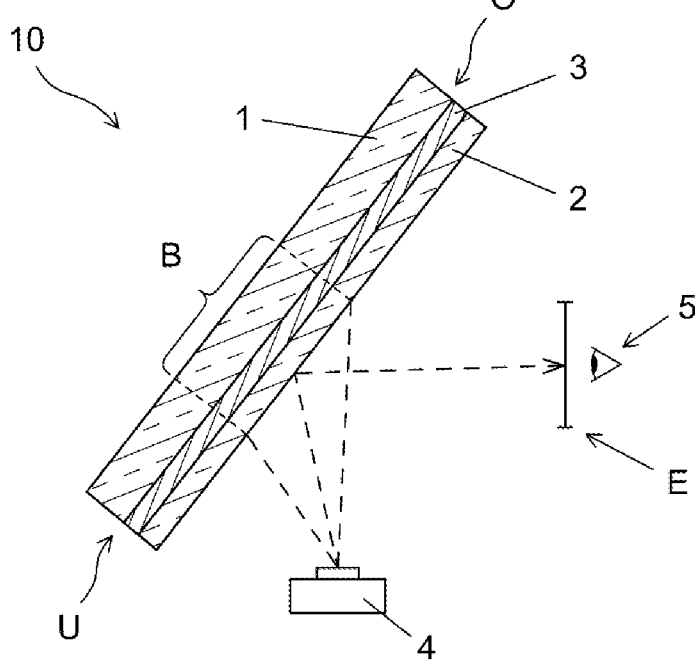
Figure 3A:
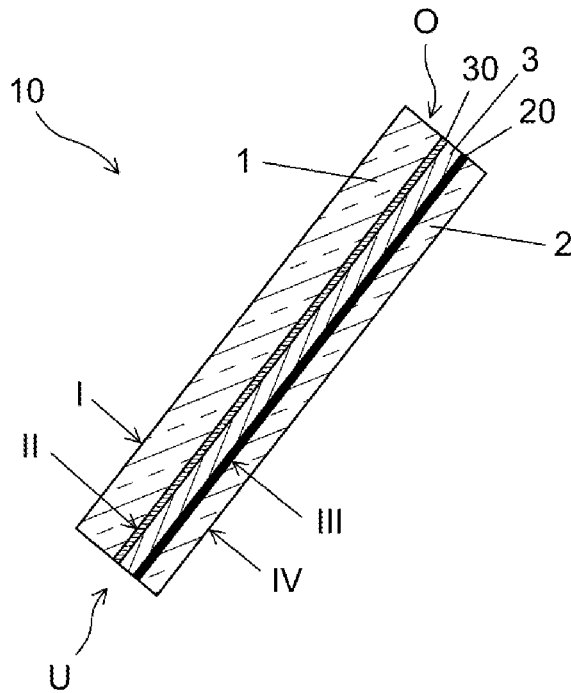
Figure 3B:
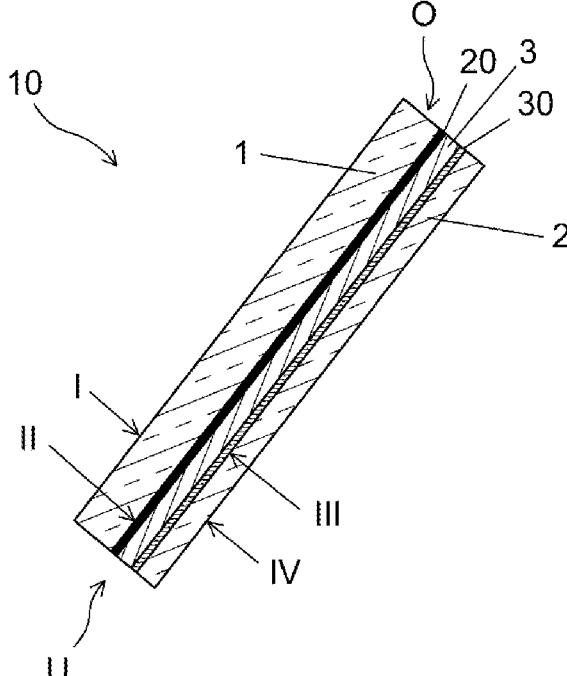
Figure 4:
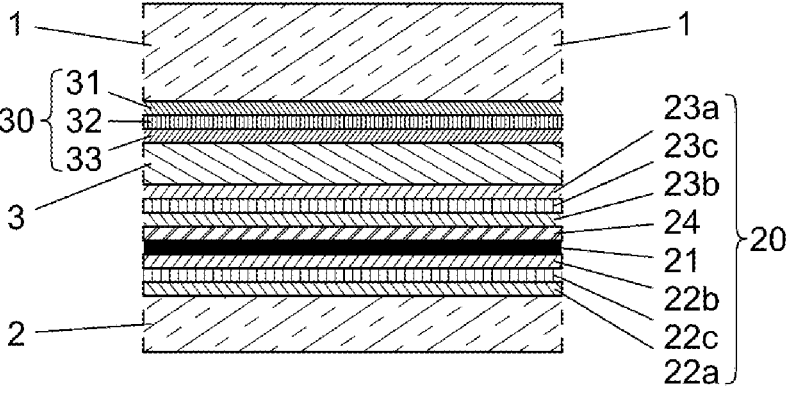
Figure 5:
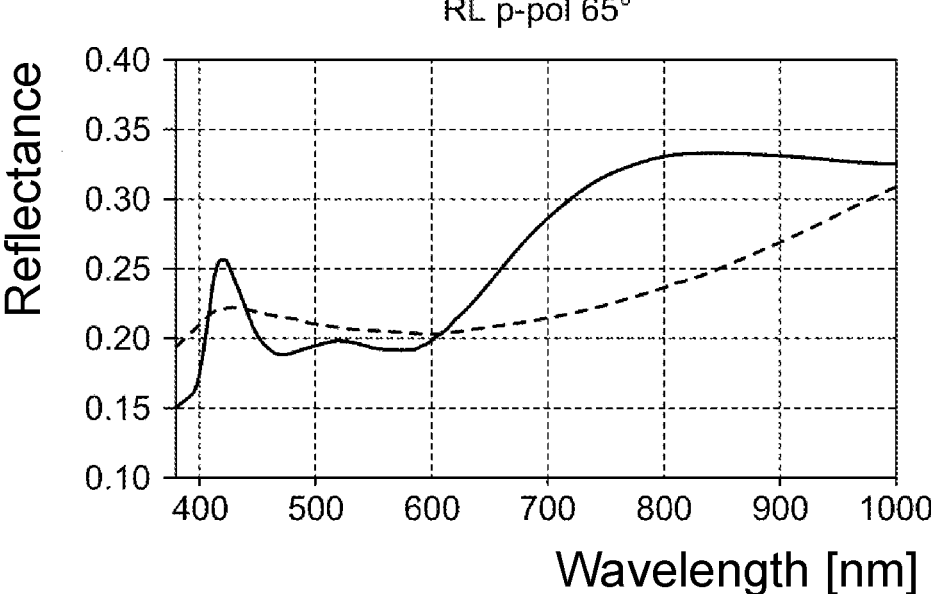

They depict:

FIG. 1 a plan view of a composite pane of a generic projection arrangement,

FIG. 2 a cross-section through the composite pane,

FIG. 3 A a cross-section through a first embodiment of a composite pane according to the invention, FIG. 3 B a cross-section through a second embodiment of a composite pane according to the invention, FIG. 4 a cross-section through an embodiment of a first coating and a second coating, and FIG. 5 a reflectance spectrum of a composite pane according to the invention with p-polarized radiation.

Statements with numerical values are generally to be understood not as exact values, but also include a tolerance of +/−1% up to +/−10%.

FIG. 1 schematically depicts a composite pane 10. FIG. 2 schematically depicts a generic projection arrangement for an HUD. The projection arrangement comprises a composite pane 10, designed as a windshield of a passenger car. The projection arrangement also has a projector 4, which is directed toward a region of the composite pane 10. This region is usually referred to as HUD region B. In this region, images generated by the projector 4 can be projected and are perceived by a viewer 5 (e.g., vehicle driver) as virtual images on the side of the composite pane 10 facing away from him when his eyes are situated within the so-called eyebox E.

The composite pane 10 is constructed from a first pane 1 as the outer pane and a second pane 2 as the inner pane of the passenger car, which are joined to one another via a thermoplastic intermediate layer 3. Its lower edge U is arranged downward in the direction of the engine of the passenger car; its upper edge O, upward in the direction of the roof. In the installed position, the first pane 1 faces the external surroundings; the second pane 2, the vehicle interior.

FIG. 3A schematically depicts a first embodiment of the composite pane 10 in cross-section. The first pane 1 has an exterior-side surface I, which, in the installed position, faces the external surroundings, and an interior-side surface II, which, in the installed position, faces the interior. Also, the composite pane 1 includes the second pane 2, which has an exterior-side surface III and an interior-side surface IV. The surface III, in the installed position, faces the external surroundings. On the other hand, the surface IV, in the installed position, faces the external surroundings.

The first pane 1 has, for example, a thickness of 2.1 mm; the second pane 2, a thickness of 1.6 mm or 2.1 mm. The intermediate layer 3 is formed, for example, from a PVB film with a thickness of 0.76 mm. The PVB film has an essentially constant thickness, apart from any surface roughness common in the art.

The interior-side surface II of the first pane 1 is provided with a first coating 30 according to the invention, provided to reduce the TTS value. The exterior-side surface III of the second pane 2 is provided with a first coating 20 according to the invention, provided as a reflection surface for the projector radiation (and possibly additionally as an IR reflecting coating).

The radiation of the projector 4 is essentially p-polarized. Since the projector 4 irradiates the composite pane 10 at an angle of incidence of about 65°, which is close to the so-called Brewster's angle, the radiation of the projector is only insignificantly reflected at the external surfaces I, IV of the composite pane 10. In contrast, the first coating 20 according to the invention is optimized for reflection of p-polarized radiation. It serves as a reflection surface for the radiation of the projector 4 to generate the HUD projection.

FIG. 3B schematically depicts a second embodiment of the composite pane 10 in cross-section. FIG. 3B differs from FIG. 3A in the arrangement of the first coating 20 and the second coating 30. In this example, the first coating 20 is arranged on the interior-side surface II of the first pane 1. In contrast, the second coating 30 is applied on the exterior-side surface III of the second pane 2.

FIG. 4 depicts the layer sequence of an embodiment of the first coating 20 and the second coating 30 according to the invention. The first coating 20 and the second coating 30 are, in each case, a stack of thin layers.

The first coating 20 comprises one electrically conductive layer 21 based on silver. A metallic blocking layer 24 is arranged directly above the electrically conductive layer. Above this, an upper dielectric layer sequence is arranged, consisting of, from bottom to top, an upper matching layer 23b, an upper refractive-index-enhancing layer 23c, and an upper anti-reflection layer 23a.

Below the electrically conductive layer 21, a lower dielectric layer sequence is arranged, consisting of, from top to bottom, a lower matching layer 22b, a lower refractive-index-enhancing layer 22c, and a lower anti-reflection layer 22a.

The second coating 30 includes, directly above the intermediate layer 3, a third purely dielectric layer 33 of titanium dioxide, a second purely dielectric layer 32, comprising a silicon dioxide layer, and a first purely dielectric layer 31 of titanium dioxide.

Materials and layer thicknesses can be found in the following example.

The layer sequences of a composite pane 10 with the first coating 20 on the exterior-side surface III of the second pane 2 and the second coating 30 on the interior-side surface II of the first pane 1 in accordance with the Example 1 according to the invention are presented in Table 1, together with the materials and geometric layer thicknesses of the individual layers. The dielectric layers of the first coating 20 can, independently of one another, be doped, for example, with boron or aluminum.

TABLE 1

| Material | Reference Character | | Layer Thickness |
|---|---|---|---|
| TiO | 31 | 30 | 90 nm |
| SiO | 32 | | 150 nm |
| TiO | 33 | | 121 nm |
| PVB | 3 | | 0.76 mm |
| SiN | 23a | 20 | 62 nm |
| SiZrN | 23c | | 10 nm |
| ZnO | 23b | | 10 nm |
| NiCr | 24 | | 0.3 nm |
| Ag | 21 | | 10.5 nm |
| ZnO | 22b | | 10 nm |

TABLE 1-continued

| Material | Reference Character | Layer Thickness |
|---|---|---|
| SiZrN | 22c | 10 nm |
| SiN | 22a | 25 nm |

As a result of the additional reflection/absorption of thermal radiation at the second coating, the TTS value of the composite pane 10 is improved, i.e., reduced, by as much as 5%. This result was unexpected and surprising for the person skilled in the art. In addition, the outer pane 1 can be tinted or colored.

FIG. 5 presents a reflectance spectrum of the composite pane 10 with a layer structure according to Table 1. The reflectance spectrum was recorded with a light source that emits p-polarized radiation of uniform intensity in the spectral range under consideration, with observation via the second pane 2 (the so-called interior-side reflectance via the interior pane) at an angle of incidence of 65° relative to the interior-side surface normal. From the graphic presentation of the spectrum, it can be seen that the coatings according to the invention of the composite pane 10 were able to improve the reflectance, in particular in the IR range (>700 nm) despite an improved TTS value.

The optical parameters obtained are reproduced in the following Table 2.

TABLE 2

| Example According to the Invention | | Comparative Example | |
|---|---|---|---|
| TL A | 71.4 | TL A | 71.4 |
| a*t | −5.1 | a*t | −1.4 |
| b*t | 6.6 | b*t | 3.7 |
| RL(A) | 24.2 | RL(A) | 24.0 |
| a*c 8° | 7.1 | a*c 8° | −0.8 |
| b*c 8° | −9.6 | b*c 8° | −4.0 |
| RL(A) 60° | 32.4 | RL(A) 60° | 28.4 |
| a*c 60° | 4.4 | a*c 60° | −0.1 |
| b*c 60° | −1.9 | b*c 60° | −2.6 |
| RL(A) p-pol | 20.0 | RL(A) p-pol | 20.5 |
| a*p-pol | 3.5 | a*p-pol | 0.4 |
| b*p-pol | −2.2 | b*p-pol | −2.1 |
| TTS | 53.7 | TTS | 59.8 |

The following colorimetric coordinates and parameters are listed:

Light transmittance according to Illuminant A: TL A,

Color values a*t and b*t according to Illuminant D65, 10°,

Light reflectance according to Illuminant A: RL A,

Color values a*c and b*c according to light incidence angle 8° Illuminant D65, 10°, Light reflectance according to light incidence angle 60°: RL A 60° (Light Source D60, Illuminant A), Color Values a*c and b*c according to 60° Illuminant D65, 10°, Light reflectance according to p-polarized radiation: RL (A) p-pol, Illuminant A, Color values a*c and b*c according to p-polarized radiation, Illuminant D65, 10°

TTS value

It can be seen that the Example according to the invention exhibited improved optical parameters. A substantial advantage of the composite pane 10 according to the invention consists in that the TTS value is reduced and, at the same time, reflectance is improved.

LIST OF REFERENCE CHARACTERS

1 first pane
2 second pane
3 thermoplastic intermediate layer
4 projector
5 viewer/vehicle driver
10 composite pane
20 first coating
21 electrically conductive layer
22a first lower dielectric layer/anti-reflection layer
22b second lower dielectric layer/matching layer
22c third lower dielectric layer/refractive-index-enhancing layer
23a first upper dielectric layer/anti-reflection layer
23b second upper dielectric layer/matching layer
23c third upper dielectric layer/refractive-index-enhancing layer
24 metallic blocking layer
30 second coating
31 first purely dielectric layer
32 second purely dielectric layer
33 third purely dielectric layer
O upper edge of the composite windshield 10
U lower edge of the composite windshield 10
B HUD region of the composite windshield 10
E eyebox
I exterior-side surface of the first pane 1 facing away from the intermediate layer 3
II interior-side surface of the first pane 1 facing the intermediate layer 3
III exterior-side surface of the second pane 2 facing the intermediate layer 3
IV interior-side surface of the second pane 2 facing away from the intermediate layer 3

The invention claimed is:

1. A composite pane for a head-up display, comprising: a first pane having a first surface and a second surface, a second pane having a first surface and a second surface, and a thermoplastic intermediate layer, which is arranged between the second surface of the first pane and the first surface of the second pane, a head-up display (HUD) region, and a first coating for reflecting p-polarized radiation and has exactly one electrically conductive layer, said electrically conductive layer being based on silver, the first coating also having at least one dielectric layer or layer sequence each having a refractive index of at least 1.9, wherein a second coating for reducing a total transmitted thermal radiation is provided, the second coating being purely dielectric and comprising, alternatingly, at least one first dielectric layer or layer sequence, whose refractive index is greater than 1.9 and a second dielectric layer or layer sequence, whose refractive index is less than 1.6 wherein the first coating is arranged on a surface of the second pane, and the second coating is arranged on a surface of the first pane, wherein the first coating is arranged on the first surface of the second pane, and wherein the second coating is arranged on the second surface of the first pane.

2. The composite pane according to claim 1, wherein the first dielectric layer or layer sequence of the second coating is formed of at least of the group consisting of silicon nitride, tin oxide, zinc oxide, titanium dioxide, zirconium dioxide, hafnium oxide, vanadium oxide, niobium oxide, tantalum oxide, and tungsten oxide.

3. The composite pane according to claim 1, wherein the second dielectric layer or layer sequence of the second coating is formed of at least of the group consisting of $SiO_2$, $MgF_2$, and a nanoporous layer.

4. The composite pane according to claim 1, wherein the electrically conductive layer has a geometric thickness of 8 nm to 14 nm.

5. The composite pane according to claim 4, wherein the electrically conductive layer has a geometric thickness of 10 nm.

6. The composite pane according to claim 1, wherein the first coating is deposited by magnetron sputtering and/or the second coating is deposited by magnetron sputtering or by a wet chemical deposition method.

7. The composite pane according to claim 1, wherein the first pane is tinted or colored.

8. The composite pane according to claim 1, wherein the first coating also has a plurality of said dielectric layers or layer sequences each having a refractive index of at least 1.9, including a dielectric layer or layer sequence on each opposing side of the electrically conductive layer, wherein the first coating is devoid of a dielectric layer or layer sequence with a refractive index less than 1.9.

9. The composite pane according to claim 8, wherein the electrically conductive layer is at least 90% (wt.) silver.

10. The composite pane according to claim 9, wherein the electrically conductive layer is at least 99% (wt.) silver.

11. The composite pane according to claim 9, wherein the electrically conductive layer has a geometric thickness of 8-14 nm.

12. The composite pane according to claim 11, wherein the first dielectric layer or layer sequence of the second coating is formed of at least of the group consisting of silicon nitride, tin oxide, zinc oxide, titanium dioxide, zirconium dioxide, hafnium oxide, vanadium oxide, niobium oxide, tantalum oxide, and tungsten oxide.

13. The composite pane according to claim 12, wherein the second coating includes another said first dielectric layer or layer sequence, said first dielectric layers or sequences being on opposing sides of the second dielectric layer or sequence.

14. The composite pane according to claim 13, wherein the second dielectric layer or layer sequence of the second coating is formed of at least of the group consisting of $SiO_2$, $MgF_2$, and a nanoporous layer.

15. The composite pane according to claim 13, wherein the first pane is tinted or colored.

16. The composite pane according to claim 1, wherein the electrically conductive layer of the first coating is the only electrically conductive layer of the pane.

17. The composite pane according to claim 1, wherein the refractive index of the second dielectric layer or layer sequence of said second coating is from 1.2 to 1.4 and the thickness thereof is from 30 nm to 500 nm.

18. The composite pane according to claim 17, wherein the thickness of the second dielectric later or layer sequence of said second coating is from 50 nm to 150 nm.

19. The composite pane according to claim 1, wherein the first coating also has a plurality of said dielectric layers or layer sequences each having a refractive index of at least 1.9, including a dielectric layer or layer sequence on each opposing side of the electrically conductive layer, wherein the first coating is devoid of a dielectric layer or layer sequence with a refractive index less than 1.9, wherein the electrically conductive layer of the first coating is the only electrically conductive layer of the pane, wherein the electrically conductive layer is at least 90% (wt.) silver, wherein the second coating includes another said first dielectric layer or layer sequence, said first dielectric layers or sequences being on opposing sides of the second dielectric layer or sequence, and wherein the refractive index of the second dielectric layer or layer sequence of said second coating is from 1.2 to 1.4 and the thickness thereof is 50 nm to 150 nm.

20. The composite pane according to claim 19, wherein the electrically conductive layer has a geometric thickness of 8-14 nm.

21. A projection arrangement for a head-up display, comprising:

the composite pane according to claim 1, and a projector that is directed toward the HUD region of the composite pane, wherein the radiation of the projector is predominantly p-polarized.

* * * * *